United States Patent
Lee et al.

(10) Patent No.: US 10,225,109 B2
(45) Date of Patent: Mar. 5, 2019

(54) METHOD AND APPARATUS FOR TRANSMITTING AND RECEIVING INFORMATION RELATED TO SRS TRANSMISSION IN FDR MODE

(71) Applicant: LG ELECTRONICS INC., Seoul (KR)

(72) Inventors: Sangrim Lee, Seoul (KR); Jaehoon Chung, Seoul (KR); Kwangseok Noh, Seoul (KR); Dongkyu Kim, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 15/249,119

(22) Filed: Aug. 26, 2016

(65) Prior Publication Data

US 2017/0264465 A1 Sep. 14, 2017

Related U.S. Application Data

(60) Provisional application No. 62/306,650, filed on Mar. 11, 2016.

(51) Int. Cl.
*H04L 25/02* (2006.01)
*H04L 5/00* (2006.01)
*H04L 5/14* (2006.01)

(52) U.S. Cl.
CPC ........ *H04L 25/0224* (2013.01); *H04L 5/0094* (2013.01); *H04L 5/1469* (2013.01); *H04L 25/023* (2013.01); *H04L 5/0051* (2013.01)

(58) Field of Classification Search
CPC . H04L 25/0224; H04L 25/023; H04L 5/1469; H04L 5/0094; H04L 5/0051
See application file for complete search history.

(56) References Cited

U.S. PATENT DOCUMENTS

| | | | |
|---|---|---|---|
| 9,572,153 B2 * | 2/2017 | Li | H04L 5/00 |
| 9,622,230 B2 * | 4/2017 | Chen | H04W 72/042 |
| 9,706,533 B2 * | 7/2017 | Pajukoski | H04W 72/0413 |
| 9,772,678 B2 * | 9/2017 | Sasanka | G06F 1/3296 |
| 2011/0098054 A1 * | 4/2011 | Gorokhov | H04B 7/024 455/452.1 |
| 2013/0010659 A1 * | 1/2013 | Chen | H04L 5/001 370/280 |
| 2013/0028138 A1 * | 1/2013 | Hao | H04L 5/0051 370/254 |

(Continued)

*Primary Examiner* — Ivan O Latorre
(74) *Attorney, Agent, or Firm* — Lee Hong Degerman Kang & Waimey (57) ABSTRACT

A method for transmitting information related to a sounding reference signal (SRS) transmission by a base station (BS) of a full duplex radio (FDR) mode in a wireless communication system includes: transmitting information related to a resource region to be used for the SRS transmission to a user equipment of the FDR mode within a resource region configured as an uplink (UL) idle interval; receiving a SRS through the resource region for the SRS transmission from the user equipment; performing an uplink (UL) channel estimation based on the received SRS; and performing a downlink (DL) channel estimation by applying a channel reciprocity characteristic to a result of the uplink (UL) channel estimation.

12 Claims, 7 Drawing Sheets

(56) References Cited

U.S. PATENT DOCUMENTS

| | | | | |
|---|---|---|---|---|
| 2013/0039233 A1* | 2/2013 | Dai | .................. | H04W 24/10 370/280 |
| 2014/0348037 A1* | 11/2014 | Yang | .................. | H04W 48/12 370/280 |
| 2014/0376398 A1* | 12/2014 | Li | .................. | H04L 1/0001 370/252 |
| 2015/0381246 A1* | 12/2015 | Huang | .................. | H04B 7/0456 370/329 |
| 2016/0065350 A1* | 3/2016 | Suzuki | .................. | H04W 28/18 370/329 |
| 2016/0081084 A1* | 3/2016 | Blankenship | .................. | H04L 5/0051 370/329 |
| 2017/0279505 A1* | 9/2017 | Zhang | .................. | H04B 7/26 |

* cited by examiner

FIG. 7

METHOD AND APPARATUS FOR TRANSMITTING AND RECEIVING INFORMATION RELATED TO SRS TRANSMISSION IN FDR MODE

Pursuant to 35 U.S.C. § 119(e), this application claims the benefit of U.S. Provisional Patent Application No. 62/306,650 filed on Mar. 11, 2016, the contents of which are hereby incorporated by reference herein in its entirety.

BACKGROUND OF THE INVENTION

Field of the Invention

The present invention relates to wireless communication, and more particularly to a method and apparatus for transmitting and receiving information associated with SRS transmission in a full duplex radio (FDR) environment.

Discussion of the Related Art

3GPP LTE (3rd Generation Partnership Project Long Term Evolution) has been designed based on a frame structure having a 1 ms TTI (transmission time interval), and a data request delay time for video application has been set to 10 ms.

However, future 5G technology is requesting data transmission having lower delay according to appearance of new applications such as realtime control and tactile Internet, and it is expected that 5G data request delay will be reduced to 1 ms.

Full Duplex Communication (FDC) or Full Duplex Radio (FDR) technology may be used in 5G communication systems. Full duplex communication (FDR) technology can simultaneously perform transmission (Tx) and reception (Rx) in the same time/frequency resources, such that system capacity of FDR technology may be theoretically double that of legacy half duplex communication (HDC) technology in which time or frequency resources are divisionally used to be orthogonal to each other.

SUMMARY OF THE INVENTION

Accordingly, the present invention is directed to a method and apparatus for transmitting and receiving information associated with SRS transmission in a full duplex radio (FDR) environment that substantially obviates one or more problems due to limitations and disadvantages of the related art.

An object of the present invention is to provide a method for allowing FDR-based base station to transmit information associated with SRS transmission in a wireless communication system.

Another object of the present invention is to provide a method for allowing an FDR-based user equipment to receive information associated with SRS transmission in a wireless communication system.

Another object of the present invention is to provide a base station (BS) configured to operate in FDR so as to transmit information associated with SRS transmission in a wireless communication system.

Another object of the present invention is to provide a user equipment (UE) configured to operate in FDR so as to receive information associated with SRS transmission in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting information related to a sounding reference signal (SRS) transmission by a base station (BS) of a full duplex radio (FDR) mode in a wireless communication system including: transmitting information related to a resource region for the SRS transmission to a user equipment of the FDR mode within a resource region configured as an uplink (UL) idle interval; receiving a SRS through the resource region for the SRS transmission from the user equipment; performing an uplink (UL) channel estimation based on the received SRS; and performing a downlink (DL) channel estimation by applying a channel reciprocity characteristic to a result of the uplink (UL) channel estimation. The information related to the resource region for the SRS transmission may include a subframe index for SRS transmission, a symbol index, or an offset value associated with an SRS transmission time. The information related to the resource region for SRS transmission may be transmitted through a physical downlink control channel (PDCCH) or a physical downlink shared channel (PDSCH). The information related to the resource region for SRS transmission and the SRS is transmitted and received within a same subframe, respectively.

In accordance with another aspect of the present invention, a method for receiving information is transmitted a sounding reference signal (SRS) transmission by a user equipment (UE) of a full duplex radio (FDR) mode in a wireless communication system includes: receiving information related to a resource region for SRS transmission from a base station of the FDR mode within a resource region configured as an uplink (UL) idle interval; transmitting a SRS to the base station through an indicated resource region based on the information related to the resource region for the SRS transmission; receiving downlink (DL) data, the downlink data being scheduled based on a channel estimation result according to the SRS transmission. The information related to the resource region for SRS transmission may include a subframe index for the SRS transmission, a symbol index, or an offset value associated with an SRS transmission time. The information related to the resource region for SRS transmission is transmitted through a physical downlink control channel (PDCCH) or a physical downlink shared channel (PDSCH). The information related to the resource region for the SRS transmission is transmitted in a subframe, and the SRS is received in the subframe.

In accordance with another aspect of the present invention, a base station for transmitting information related to a sounding reference signal (SRS) transmission in a wireless communication system, the base station operates in a full duplex radio (FDR) mode, the base station includes: a transmitter configured to transmit information related to a resource region for the SRS transmission to a user equipment of the FDR mode within a resource region configured as an uplink (UL) idle interval; a receiver configured to receive a SRS through the resource region for the SRS transmission from the user equipment (UE); and a processor configured to perform an uplink (UL) channel estimation based on the received SRS and perform a downlink (DL) channel estimation by applying a channel reciprocity characteristic to a result of the uplink (UL) channel estimation.

In accordance with another aspect of the present invention, a user equipment (UE) for receiving information related to a sounding reference signal (SRS) transmission in a wireless communication system, the user equipment operates in a full duplex radio (FDR) mode, the user equipment includes: a receiver configured to receive information related to a resource region for SRS transmission from a base station of the FDR mode within a resource region configured as an uplink (UL) idle interval; and a transmitter configured to transmit a SRS to the base station through an indicated resource region based on the information related to the resource region for SRS transmission, wherein the receiver is configured to receive downlink (DL) data, the downlink data being scheduled based on a channel estimation result according to the SRS transmission.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 1:
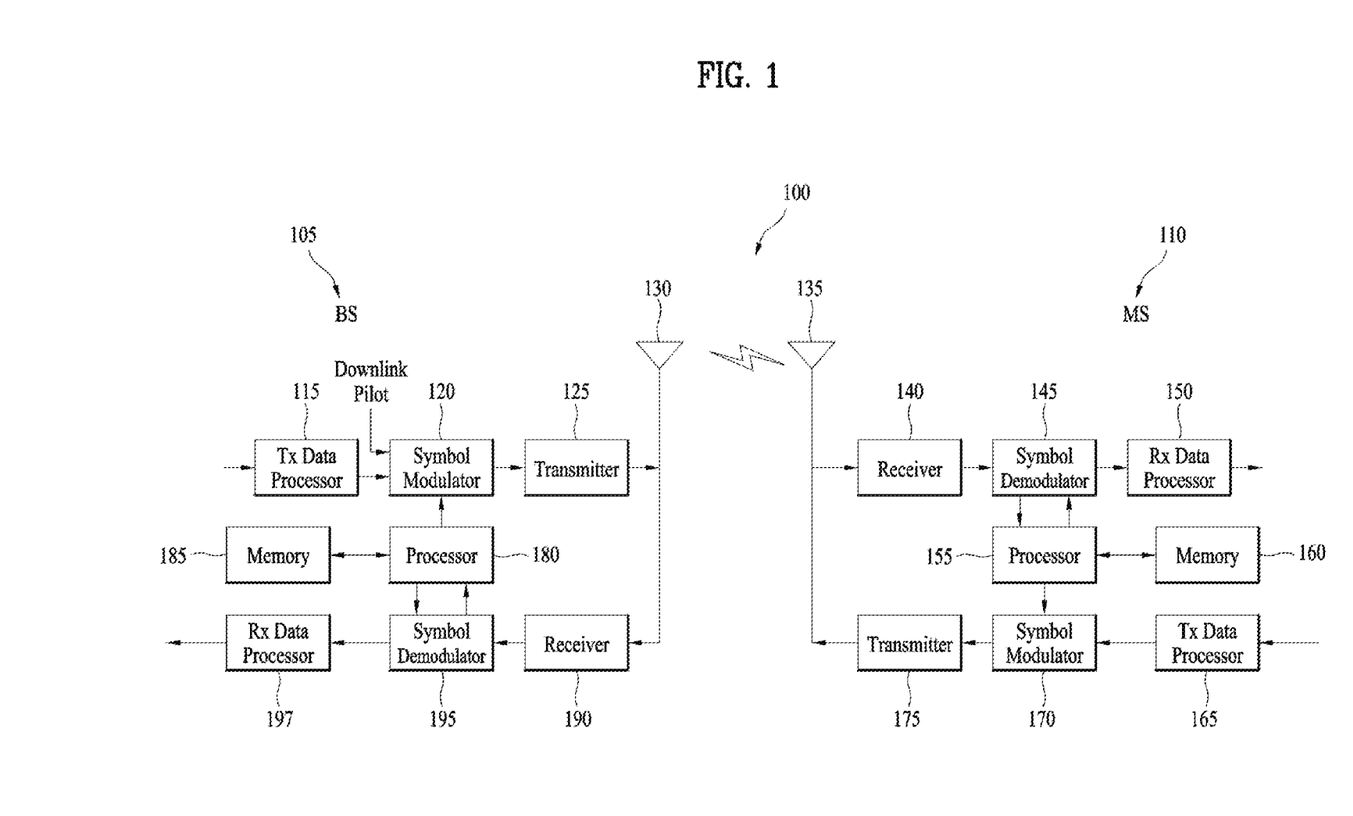
FIG. 1 is a block diagram illustrating configurations of a base station (BS) and a user equipment (UE) in a wireless communication system.
Figure 2:
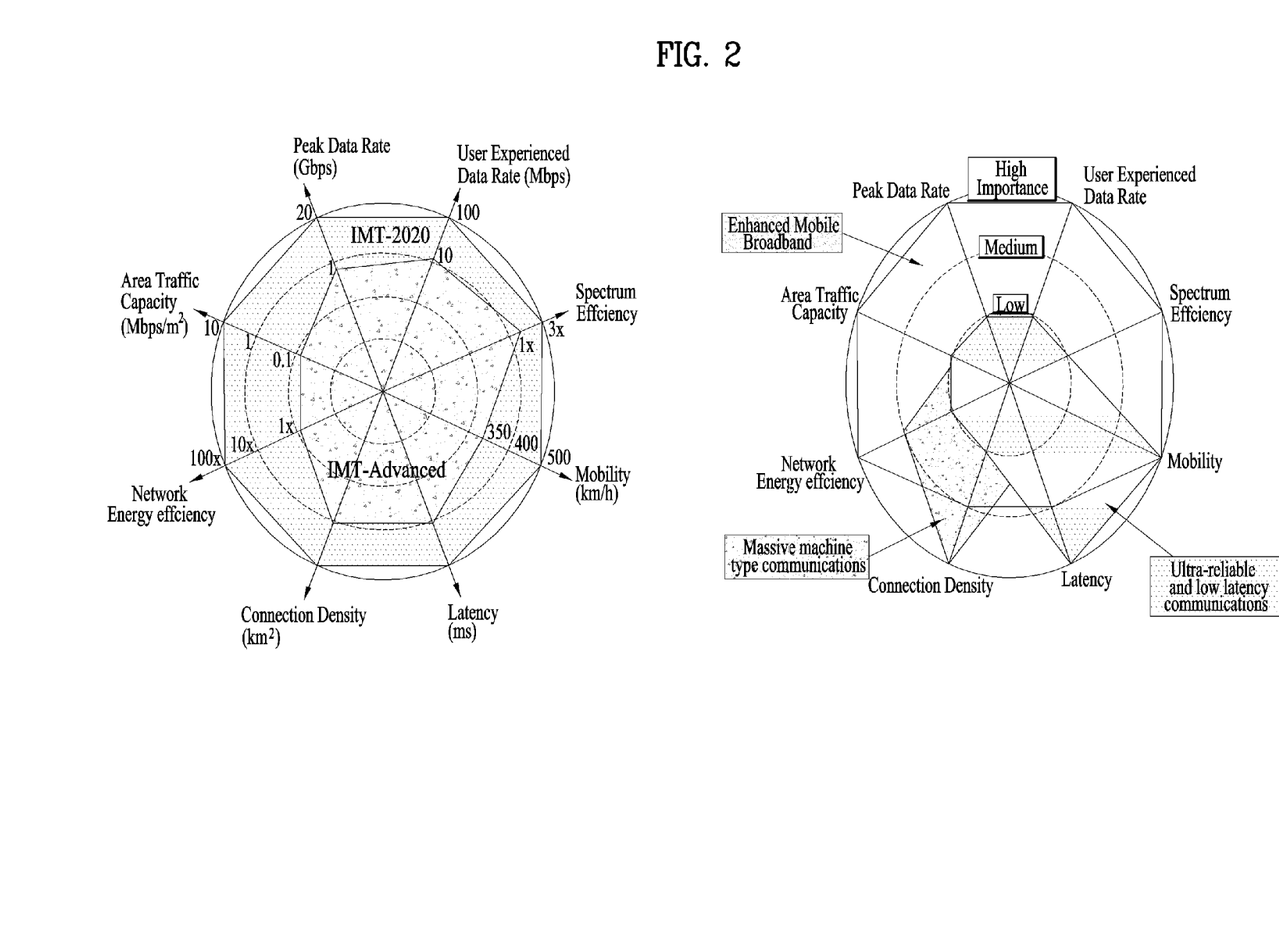
FIG. 2 is a conceptual diagram illustrating correlation between 5G IMT 2020 kernel performance requirements and 5G performance requirements per service scenario.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

In the next generation 5G system, scenarios may be classified into Enhanced Mobile BroadBand (eMBB), Ultra-reliable Machine-Type Communications (uMTC), and Massive Machine-Type Communications (mMTC), etc. The eMBB is a next generation mobile communication scenario having various characteristics, for example, High Spectrum Efficiency, High User Experienced Data Rate, High Peak Data Rate, etc. The uMTC is a next generation mobile communication scenario (for example, V2X, Emergency Service, Remote Control) having various characteristics, for example, Ultra Reliable, Ultra Low Latency, Ultra High Availability, etc. The mMTC is a next generation mobile communication scenario (e.g., IoT) having various characteristics, for example, Low Cost, Low Energy, Short Packet, Massive Connectivity, etc.

In the next generation 5G system, scenarios may be classified into Enhanced Mobile BroadBand (eMBB), Ultra-reliable Machine-Type Communications (uMTC), Massive Machine-Type Communications (mMTC), etc. The eMBB is a next generation mobile communication scenario having various characteristics, for example, High Spectrum Efficiency, High User Experienced Data Rate, High Peak Data Rate, etc. The uMTC is a next generation mobile communication scenario (for example, V2X, Emergency Service, Remote Control) having various characteristics, for example, Ultra Reliable, Ultra Low Latency, Ultra High Availability, etc. The mMTC is a next generation mobile communication scenario (e.g., IoT) having various characteristics, for example, Low Cost, Low Energy, Short Packet, Massive Connectivity, etc.

FIG. 2 is a conceptual diagram illustrating correlation between 5G IMT 2020 kernel performance requirements and 5G performance requirements per service scenario.

Specifically, the uMTC Service may have very restrictive Over The Air (OTA) latency requirements, and may request high mobility and high reliability (OTA Latency: <1 ms, Mobility: >500 km/h, BLER: <10-6).

Figure 3:
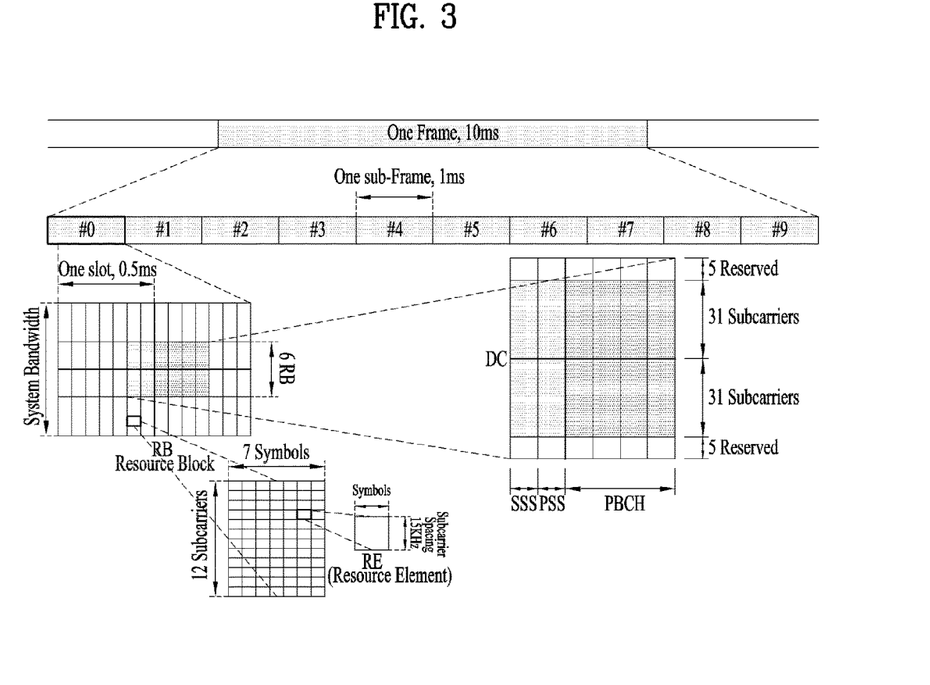
FIG. 3 is a conceptual diagram illustrating a frame structure for use in 3GPP LTE/LTE-A.

FIG. 3 is a conceptual diagram illustrating a frame structure for use in 3GPP LTE/LTE-A.

Referring to FIG. 3, one frame may 10 ms such that the single frame may include ten 1 ms subframes. One subframe may include two 0.5 ms slots, and one slot may include 7 OFDM symbols. One resource block (RB) may include not only 12 subcarriers arranged at intervals of 15 kHz, but also 7 OFDM symbols. Center Frequency 6RB may carry a primary synchronization signal (PSS), a secondary synchronization signal (SSS) for synchronization and a Physical Broadcast Channel (PBCH) for system information (SI). Here, there may be a difference in positions of the above frame structure, signals, and channels according to Normal/Extended CP and TDD/FDD.

Figure 4:
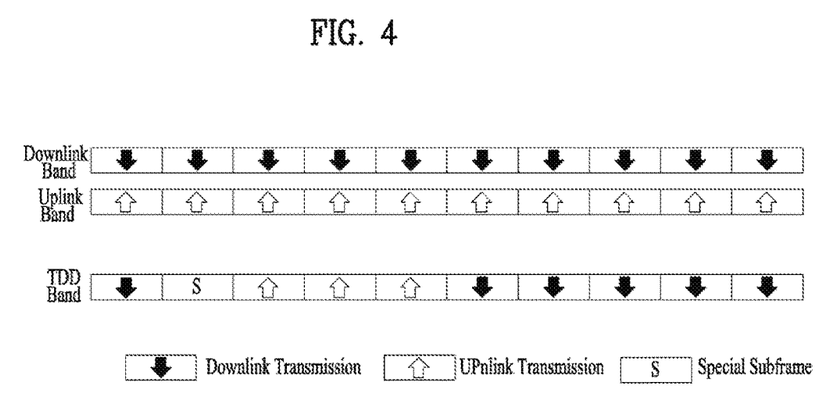
FIG. 4 is a conceptual diagram illustrating an FDD/TDD frame structure for use in 3GPP LTE/LTE-A.
Figure 5:
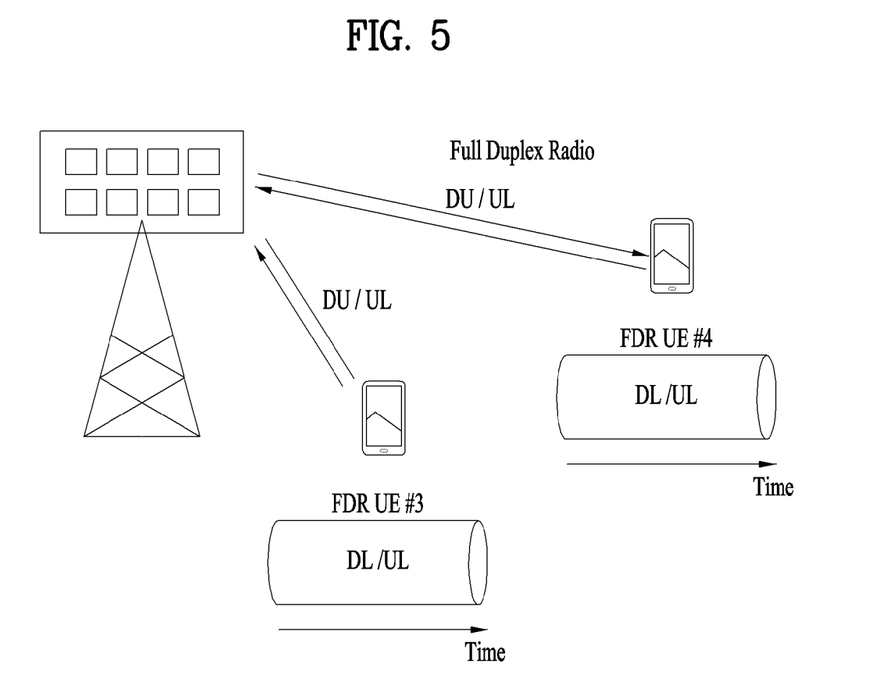
FIG. 5 is a conceptual diagram illustrating a cellular system in which an eNB and a UE operate in FDR (Full Duplex Radio).

FIG. 4 is a conceptual diagram illustrating an FDD/TDD frame structure for use in 3GPP LTE/LTE-A. FIG. 5 is a conceptual diagram illustrating a cellular system in which an eNB and a UE operate in FDR (Full Duplex Radio).

As can be seen from TDD (Time Division Duplex) of FIG. 4, data may be transmitted in only one of two directions (i.e., downlink (DL) and uplink (UL) directions). In contrast, as can be seen from the cellular environment, both the eNB and the UE may operate in FDR. UL and DL transmission may be simultaneously carried out every time, such that a transfer rate two times that of the legacy system may be acquired in an ideal case.

FDR technology simultaneously uses downlink (DL) and uplink (UL) within only one band, resulting in implementation of a transfer rate corresponding to double that of the TDD system of the HDR operation executed in the same band. However, the above transfer rate is a gain capable of being obtained when DL and UL stay in a full buffer situation (i.e., when both directions are fully filled with data to be sent). In addition, there may be a critical point in the transfer rate gain capable of being actually obtained by D2D (Device-to-Device) interference. Accordingly, an idle time may occur in UL directional resources, and a method for effectively using the idle time is needed.

The present invention discloses a method for applying an uplink (UL) idle time generated in the FDR operation to the system.

Embodiment 1: Method for Allocating UL Reference Signal (e.g., SRS) for Channel Reciprocity to UL Idle Time Generated in FDR Mode FIG. 6 is a conceptual diagram illustrating an FDR frame structure.

Figure 6:
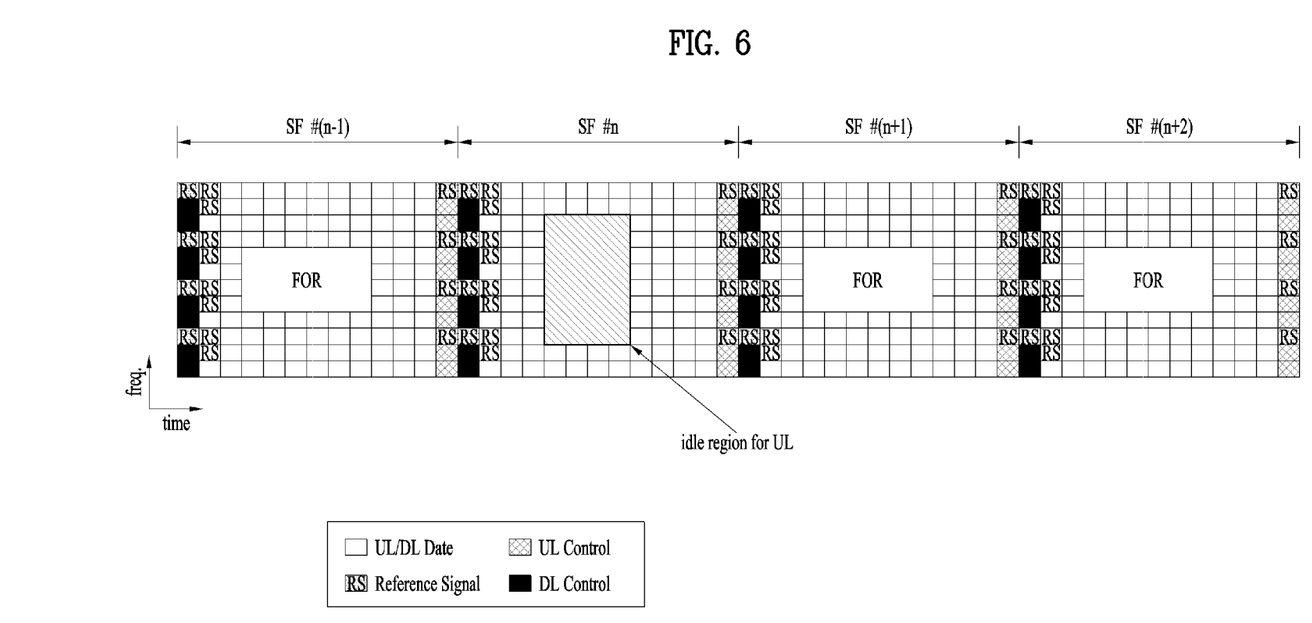
FIG. 6 is a conceptual diagram illustrating an FDR frame structure.

Referring to FIG. 6, the FDR frame structure may have the UL idle time. The UL idle time is explicitly established so that the corresponding idle time can be utilized. The idle time may be a band located before a specific time (e.g., subframe #n), or may be limited to specific time/frequency resources. According to the FDR UL idle time setting method, the base station (BS) may include the idle time in system information (SI), such that the BS may perform signaling of the resultant system information (SI). For example, the BS may designate the time/frequency domains corresponding to the idle time through a physical broadcast channel (e.g., xPBCH). Alternatively, the BS may include idle time information in new DCI information so as to dynamically establish the FDR UL idle time per subframe, and may thus transmit the resultant DCI information to the UE.

Method 1 of Embodiment 1: FDR UL SRS Transmission

In order to allow the eNB for use in LTE to recognize a DL channel, the eNB may transmit a cell-specific RS (CRS) or Channel State Information-RS (CSI-RS). The user equipment (UE) may perform DL channel estimation on the basis of such recognition, and may report CSI feedback information to the eNB (or BS) using UL resources. The eNB may perform DL resource scheduling, Modulation and Coding Scheme (MCS), and MIMO precoding using the CSI feedback information.

In TDD, data is transmitted within the same band, such that channel reciprocity can be utilized. Here, it is assumed that the channel reciprocity has no errors through calibration or the like. In TDD, SRS may be utilized for channel reciprocity. However, it is obvious to those skilled in the art that channel accuracy is greatly deteriorated due to a time difference between the SRS transmission time point and a time point at which channel information of the actual DL is utilized. Therefore, DL channel estimation may be recognized through feedback.

eNB Behavior

For DL channel estimation, the eNB (hereinafter referred to as FDR eNB) may perform signaling or triggering for the UE in such a manner that SRS can be transmitted to the UE (hereinafter referred to as FDR UE) configured to perform the FDR operation. Here, information regarding the SRS transmission time or information regarding the time/frequency domains may be contained in the above signaling information and may then be transmitted. In this case, either a time point at which SRS will be transmitted or the time/frequency domains may be allocated to the idle time. The UE may pre-recognize the idle time as necessary.

For example, if the FDR eNB has data to be sent to FDR UE #1, the FDR eNB may perform signaling in a manner that the SRS can be momentarily transmitted to the FDR UE #1 through physical layer (PHY) signaling. In this case, the above signaling may include information (e.g., the corresponding time information scheduled to be used for SRS transmission from among the idle interval. For example, information regarding a time point at which FDR UE will transmit SRS may include only one subframe number (or subframe index), symbol index, and information regarding only one frequency domain information. Alternatively, information regarding a time point at which FDR UE will transmit SRS may include information regarding subframe numbers, symbol indices, frequency domains, etc. Alternatively, information regarding a time point at which FDR UE will transmit SRS may include an offset from a current time (e.g., a time point at which the above signaling information indicating SRS transmission is received), and may further include information regarding a frequency domain and information regarding the SRS transmission period. In addition, assuming that the UE uses multiple antennas, the above signaling information may further include information regarding the SRS transmission time per antenna (e.g., per antenna index) and information regarding the SRS transmission frequency domain.

The eNB may transmit the above signaling information at various time points. For example, the eNB may transmit the above signaling information over a Physical Downlink Control Channel (PDCCH), a Physical Downlink Shared Channel (PDSCH), or a newly defined channel.

If the above signaling information is transmitted over the newly defined channel, the eNB may establish a preamble interval at a specific time in a DL subframe, such that the above signaling information can be transmitted at the specific time. Alternatively, the eNB may allocate a specific subcarrier or a specific subband to the DL subframe, such that the above signaling information may be transmitted to the corresponding UE through the corresponding frequency domain.

The corresponding region through which SRS is transmitted may be multiplexed in various ways (e.g., FDM/TDM/CDM) each having orthogonality, so as to multiplex multiple users, and may then be transmitted.

UE Behavior

The UE may continuously monitor the time or frequency domain in which the above signaling information is established, such that the FDR eNB may recognize signaling information to be transmitted to the FDR eNB. If the signaling information to be transmitted to the FDR eNB exists, the SRS transmission time point may be recognized on the basis of the above information.

Figure 7:
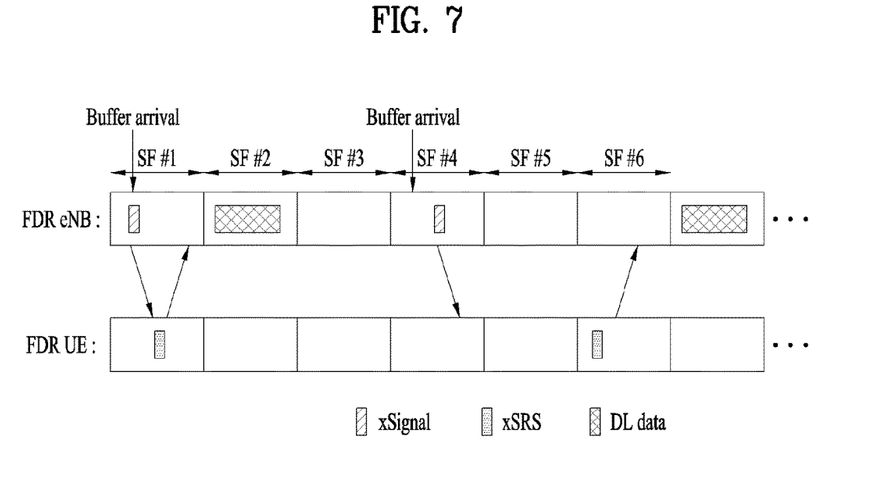
FIG. 7 is a conceptual diagram illustrating occurrence of buffer arrival.

FIG. 7 is a conceptual diagram illustrating occurrence of buffer arrival.

FIG. 7 is a conceptual diagram illustrating a method for allowing the FDR eNB to transmit data using the new method. If first buffer arrival occurs in Subframe (SF) #1, the eNB may include a signal (e.g., xSignal) for requesting the UL reference signal in predetermined time/frequency domains promised by the FDR eNB and UE, and may then transmit the signal (e.g., xSignal). In this case, the UE may periodically monitor the promised resource regions (time/frequency domains), may recognize the presence of the requested signal, and may transmit the SRS (e.g., the SRS may also be defined as xSRS) to the time/frequency domains designated by the UE reference signal requesting signal (xSignal). If buffer arrival occurs in Subframe (SF) #1, the UE may transmit the SRS at Subframe #1.

The FDR eNB having received the SRS from the UE may perform UL channel estimation, may perform DL channel estimation on the basis of channel reciprocity, may determine MCS/MIMO precoding for DL data transmission on the basis of the DL channel estimation result, and may transmit DL data to the UE at Subframe #2.

The case of second buffer arrival may indicate that the SRS (e.g., xSRS) transmission time is established at a further rear side as compared to the above first case. If buffer arrival occurs in Subframe (SF) #4, the UE may transmit the SRS at Subframe #6. The FDR eNB may transmit DL data to the UE at Subframe #7.

Embodiment 2: Method for Allocating the UL Idle Time Encountered in the FDR Operation to the Scheduling Request (SR) Interval If the idle time (e.g., the idle time established on a subframe basis) occurs, the eNB may previously broadcast the corresponding idle time to the SR through PDCCH, PDSCH, higher layer signaling (Radio Resource Control (RRC) signaling), or system information (SI), and the corresponding idle time may be indicated through UE dedicated signaling.

The UL idle time is utilized according to one embodiment, resulting in higher efficiency of communication resources.

The method and apparatus for transmitting and receiving information associated with SRS transmission in FDR may be applied to various wireless communication systems such as 3GPP LTE-A, 5G communication system, etc.

As is apparent from the above description, the embodiments of the present invention can increase efficiency of communication resources using the UL idle time.

The above-described embodiments correspond to combinations of elements and features of the present invention in prescribed forms. In addition, the respective elements or features may be considered selective unless explicitly mentioned otherwise. Each of the elements or features can be implemented in a form failing to be combined with other elements or features. Moreover, it is possible to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. In addition, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting information associated with a sounding reference signal (SRS) transmission in a wireless communication system, the method performed by a base station of a full duplex radio (FDR) mode and comprising:
   transmitting a physical broadcast channel (PBCH) in a subframe to a user equipment (UE) of the FDR mode, the PBCH including information related to a resource region for the SRS transmission; and
   receiving an SRS from the UE via the resource region based on the PBCH;

performing an uplink (UL) channel estimation based on the received SRS; and performing a downlink (DL) channel estimation by applying a channel reciprocity characteristic to a result of the UL channel estimation, wherein the resource region is assigned to an UL idle interval of the subframe.

2. The method according to claim 1, wherein the information related to the resource region includes symbol index information for the SRS transmission or frequency region information for the SRS transmission.

3. The method according to claim 1, wherein the information related to the resource region is transmitted via a physical DL control channel or a physical DL shared channel.

4. A method for receiving information related to a sounding reference signal (SRS) transmission in a wireless communication system, the method performed by a user equipment of a full duplex radio (FDR) mode and comprising:

receiving a physical broadcast channel (PBCH) in a subframe from a base station (BS) of the FDR mode, the PBCH including information related to a resource region for the SRS transmission;

transmitting an SRS to the BS via the resource region based on the PBCH; and receiving downlink (DL) data from the BS, the DL data scheduled based on a channel estimation result according to the SRS transmission, wherein the resource region is assigned to an uplink (UL) idle interval of the subframe.

5. The method according to claim 4, wherein the information related to the resource region includes symbol index information for the SRS transmission or frequency region information for the SRS transmission.

6. The method according to claim 4, wherein the information related to the resource region received via a physical DL control channel or a physical DL shared channel.

7. A base station (BS) for transmitting information related to a sounding reference signal (SRS) transmission in a wireless communication system, the BS operating in a full duplex radio (FDR) mode and comprising:

a transmitter configured to transmit information;
a receiver configured to receive information; and
a processor configured to:
control the transmitter to transmit a physical broadcast channel (PBCH) in subframe to a user equipment (UE) of the FDR mode, the PBCH including information related to a resource region for the SRS transmission;

control the receiver to receive an SRS from the UE via the resource region based on the PBCH;

perform an uplink (UL) channel estimation based on the received SRS; and perform a downlink (DL) channel estimation by applying a channel reciprocity characteristic to a result of the uplink (UL) channel estimation, wherein the resource region is assigned to an UL idle interval of the subframe.

8. The BS according to claim 7, wherein the information related to the resource region includes symbol index information for the SRS transmission or frequency region information for the SRS transmission.

9. The BS according to claim 7, wherein the information related to the resource region is transmitted via a physical DL control channel or a physical DL shared channel.

10. A user equipment (UE) for receiving information related to a sounding reference signal (SRS) transmission in a wireless communication system the UE operating in a full duplex radio (FDR) mode and comprising:

a receiver configured to receive information;
a transmitter configured to transmit information;
and a processor configured to:
control the receiver to receive a physical broadcast channel (PBCH) in a subframe from a base station (BS) of the FDR mode, the PBCH including information related to a resource region for the SRS transmission;

control the transmitter to transmit an SRS to the BS via the resource region based on the PBCH; and control the receiver to receive downlink (DL) data from the BS, the DL data scheduled based on a channel estimation result according to the SRS transmission, wherein the resource region is assigned to an uplink (UL) idle interval of the subframe.

11. The UE according to claim 10, wherein the information related to the resource region includes symbol index information for the SAS transmission or frequency region information for the SRS transmission.

12. The UE according to claim 10, wherein the information related to the resource region is received via a physical DL control channel or a physical DL shared channel.

* * * * *